United States Patent
Fang

(10) Patent No.: US 8,310,464 B2
(45) Date of Patent: Nov. 13, 2012

(54) SIMULTANEOUS MULTIPLE LOCATION TOUCH SYSTEMS

(75) Inventor: Wendy Xiaowen Fang, Murphy, TX (US)

(73) Assignee: Texas Instruments Incorporated, Dallas, TX (US)

( * ) Notice: Subject to any disclaimer, the term of this patent is extended or adjusted under 35 U.S.C. 154(b) by 992 days.

(21) Appl. No.: 12/327,691

(22) Filed: Dec. 3, 2008

(65) Prior Publication Data

US 2010/0097343 A1    Apr. 22, 2010

Related U.S. Application Data

(60) Provisional application No. 61/105,964, filed on Oct. 16, 2008.

(51) Int. Cl.
*G06F 3/045*    (2006.01)
(52) U.S. Cl. ............... 345/174; 345/173; 178/18.01; 178/18.02; 178/18.03
(58) Field of Classification Search ............ 345/174, 345/173, 137; 178/18.01
See application file for complete search history.

(56) References Cited

U.S. PATENT DOCUMENTS

| | | | | |
|---|---|---|---|---|
| 4,704,501 A | * | 11/1987 | Taguchi et al. | 345/173 |
| 5,327,163 A | * | 7/1994 | Hashimoto et al. | 345/173 |
| 5,831,600 A | * | 11/1998 | Inoue et al. | 345/173 |
| 5,854,451 A | * | 12/1998 | Miyazaki et al. | 178/18.05 |
| 6,819,316 B2 | * | 11/2004 | Schulz et al. | 345/174 |
| 7,969,330 B2 | * | 6/2011 | Philipp | 341/33 |
| 8,094,135 B2 | * | 1/2012 | Chen | 345/174 |
| 2007/0198926 A1 | * | 8/2007 | Joguet et al. | 715/702 |

* cited by examiner

*Primary Examiner* — Grant Sitta
(74) *Attorney, Agent, or Firm* — John J. Patti; Wade J. Brady, III; Frederick J. Telecky, Jr.

(57) ABSTRACT

Various apparatuses, methods and systems for detecting simultaneous touches at multiple locates are disclosed herein. For example, some embodiments provide an apparatus for detecting a touch, the apparatus including a resistive touch screen and a controller connected to the touch screen. The touch screen includes a number of electrically conductive columns and rows. In various embodiments, the touch screen is an analog matrix, with the overlapping columns and rows forming a matrix of cubics that can each detect one touch at a time, and with the location of the touch detectable in an analog fashion within each cubic. The resolution of the analog matrix in these embodiments is thus higher than that of the columns and rows. The controller includes an analog to digital converter switchably and sequentially connected to each of the columns and rows. The controller also includes a voltage source switchably and sequentially connected to each of the columns and rows. The controller is adapted to connect the voltage source to one of the rows when the analog to digital converter is sequentially connected to each of the columns and to connect the voltage source to one of the columns when the analog to digital converter is sequentially connected to each of the rows.

8 Claims, 6 Drawing Sheets

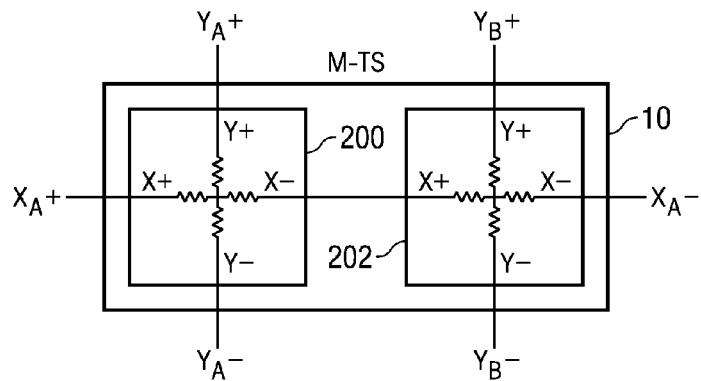
*FIG. 5A*
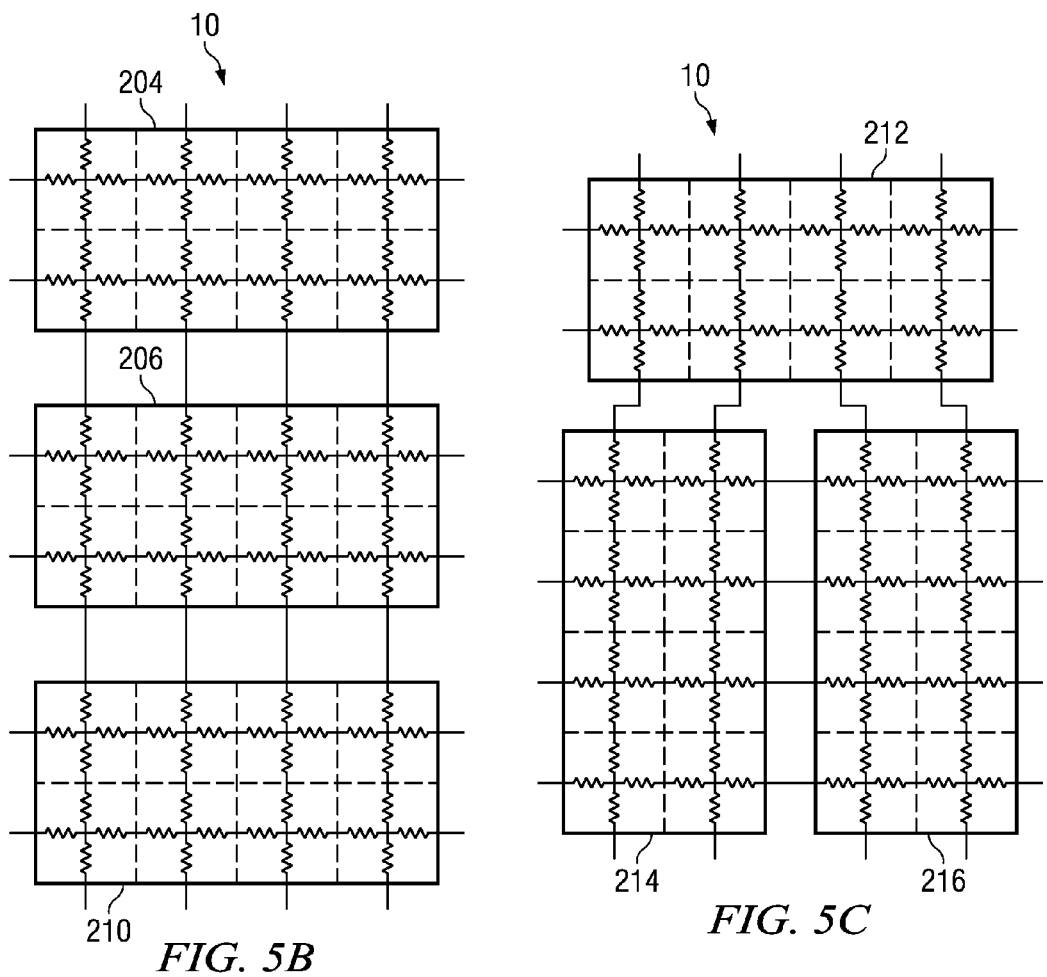
*FIG. 5B*  *FIG. 5C*

SIMULTANEOUS MULTIPLE LOCATION TOUCH SYSTEMS

CROSS REFERENCE TO RELATED APPLICATION

The present application claims priority to (i.e., is a non-provisional of) U.S. Provisional Patent Application No. 61/105,964 entitled "Simultaneous Multiple Location Touch Systems", and filed Oct. 16, 2008 by Wendy Xiaowen Fang. The aforementioned application is assigned to an entity common hereto, and the entirety of the aforementioned application is incorporated herein by reference for all purposes.

BACKGROUND

Computer systems and other electronic systems typically include a user interface enabling a user to interact with and control the systems. For example, a computer system often includes some type of monitor to display information, a keyboard with which to type input and a mouse or other pointing device to position a cursor within a graphical user interface. For portable devices and for computer systems and other electronic systems in public places or with other special requirements, these typical user interfaces may be supplemented with or replaced by a touch sensitive screen. For example, medical monitoring systems in a hospital or industrial process control systems in a factory may be much more convenient to operate by touching a touch sensitive display screen rather than using a keyboard and mouse. Touch sensitive screens are also particularly beneficial for portable devices with limited space for input devices, such as cellular telephones, personal digital assistant (PDA) devices, and portable electronic game systems. A touch sensitive screen or touch screen system displays information such as text, graphics, or other virtual or software control devices (switch, button, scroll bar, dial and so on), and detects the location of a touch on the screen.

A number of different types of touch screens are known using a variety of touch sensing technologies, such as resistive, capacitive and surface acoustic wave (SAW) systems. A resistive touch screen use a touch sensitive overlay over a display. The overlay has two layered transparent sheets separated by insulating spacer dots. The inner surfaces of the two sheets are coated with an electrically conductive coating, and a wire is attached to each edge of each sheet. When the touch screen is pressed, the two sheets are pressed into contact and an electrical circuit is completed through the two sheets. The resistance between a wire at the edge of one sheet to another wire at the edge of the second sheet can be used to determine the location of the touch. However, a resistive touch screen can detect the location of only one touch at a time. If the resistive touch screen is simultaneously pressed in multiple locations, the location will not be correctly determined.

A capacitive touch screen includes a capacitive storage layer placed over a display. When a user touches the capacitive touch screen, some of the electrical charge on the capacitive storage layer is transferred to the users finger. Detectors at the four corners of the capacitive storage layer are used to determine the distance to the contact based on the relative differences in charge at the corners. However, a capacitive touch screen is more expensive and complex than a resistive touch screen, is susceptible to electrical noise and cannot be used with a stylus or gloved finger. A surface acoustic wave (SAW) touch screen uses acoustic transducers and reflectors on the glass surface of a display, detecting where an acoustic wave is disturbed by a touch on the glass surface. The SAW touch screen is even more expensive than a capacitive touch screen, has a higher power consumption than a resistive touch screen and may be sensitive to environmental conditions such as surrounding objects, dirt or moisture.

Portable electronic devices such as cellular telephones, personal digital assistant (PDA) devices, and portable electronic game systems be greatly enhanced by a touch sensitive display that can detect multiple simultaneous touches. However, the cost and complexity of existing systems for detecting multiple simultaneous touches on the screen are often prohibitive for these types of portable electronic devices and make their use unattractive even in more expensive electronic equipment.

SUMMARY

Various apparatuses, methods and systems for detecting simultaneous touches at multiple locates are disclosed herein. For example, one embodiment provides an apparatus for detecting a touch, the apparatus including a resistive touch screen and a controller connected to the touch screen. The touch screen includes a number of electrically conductive columns and rows. The controller includes an analog to digital (A/D) converter switchably and sequentially connected to each of the columns and rows. The controller also includes a voltage source switchably and sequentially connected to each of the columns and rows. The controller is adapted to connect the voltage source to one of the rows when the A/D converter is sequentially connected to each of the columns and to connect the voltage source to one of the columns when the A/D converter is sequentially connected to each of the rows.

Other embodiments provide a method of detecting multiple simultaneous touches on a touch screen. In one particular embodiment, the method includes sequentially applying a voltage to each row of the touch screen and sequentially reading a voltage level from each column of the touch screen while the voltage is applied to each of the rows. The method also includes sequentially applying the voltage to each column of the touch screen and sequentially reading the voltage level from each row of the touch screen while the voltage is applied to each of the columns.

Other embodiments provide apparatuses for detecting simultaneous touches in multiple locations on a touch screen. In one particular embodiment, the apparatus includes a display panel, a touch screen in front of the display panel and a controller connected to the touch screen. The touch screen includes multiple touch sensitive panels. Each panel includes a first sheet with a number of electrically conductive columns and a second sheet with a number of electrically conductive rows, with the first and second sheets being separated from each other by spacers when not touched. The controller includes an A/D converter switchably and sequentially connected to column and row, and a multiplexer for sequentially connecting the A/D converter to each column and row. The controller also includes a voltage source switchably and sequentially connected to each column and row. The controller is adapted to connect the voltage source to a row while the A/D converter is connected to a column, and to connect the voltage source to a column when the A/D converter is connected to a row. The controller also includes a touch detector having a ground switchably connected to all of the columns in the pluralities of columns, a pullup resistor connected at a first end to all of the rows and at a second end to the voltage source. The touch detector also includes a comparator having a first input, a second input and an output. The first input is connected to the first end of the pullup resistor and the second input is connected to a threshold voltage source, so that the output changes state when the touch screen is touched.

This summary provides only a general outline of some particular embodiments. Many other objects, features, advantages and other embodiments will become more fully apparent from the following detailed description, the appended claims and the accompanying drawings.

BRIEF DESCRIPTION OF THE DRAWINGS

A further understanding of the various embodiments may be realized by reference to the figures which are described in remaining portions of the specification. In the figures, like reference numerals may be used throughout several drawings to refer to similar components.

FIGS. 5A, 5B and 5C depict various examples of touch screens having multiple touch sensitive panels.

DESCRIPTION

Figure 1:
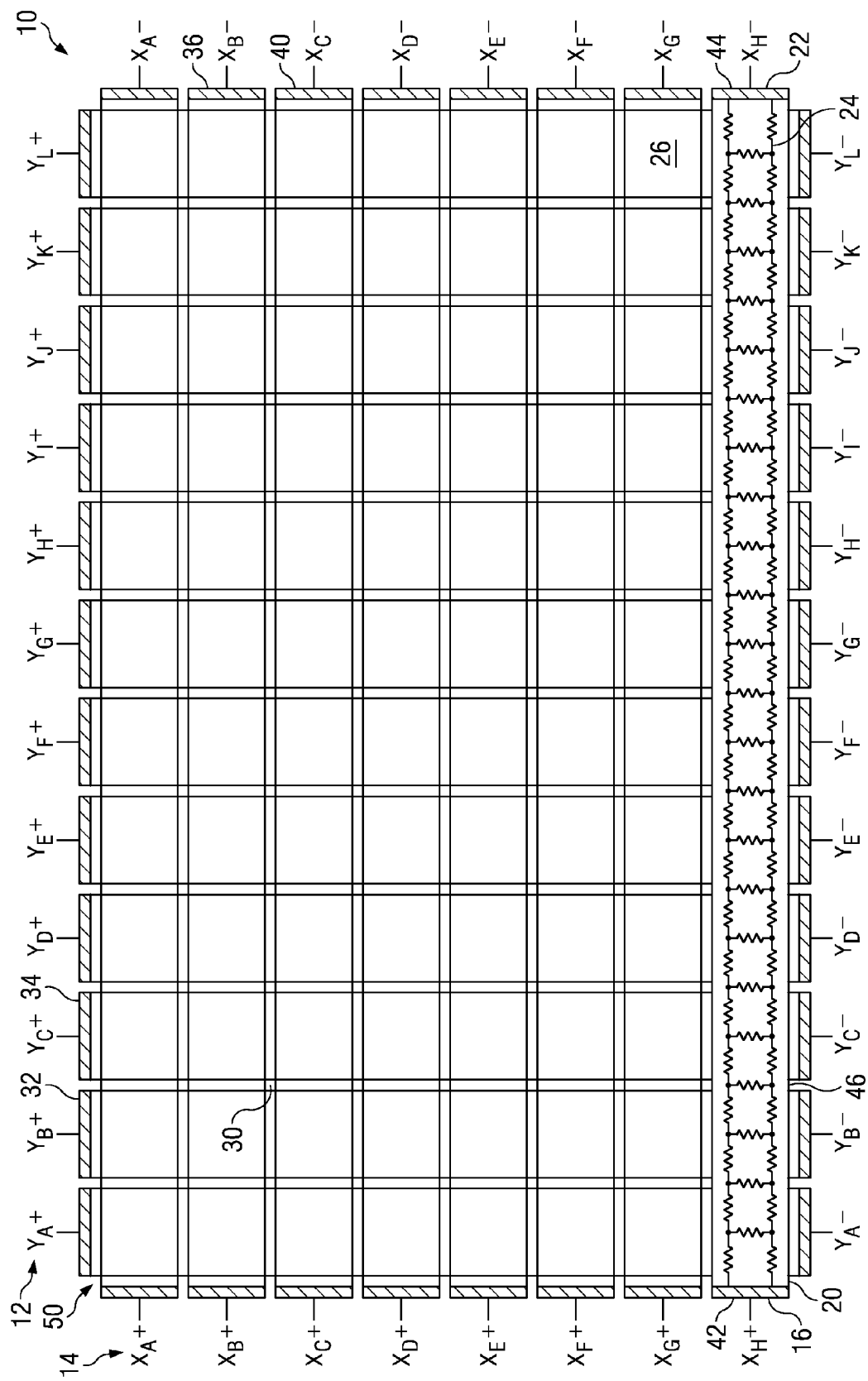
FIG. 1 depicts a touch screen having multiple electrically conductive rows and columns that may be used to detect simultaneous touches in multiple locations.

The drawings and description, in general, disclose various embodiments of resistive simultaneous multiple location touch sensitive systems. The touch sensitive systems disclosed herein include a touch screen having a pair of substantially transparent sheets layered against each other, with spacers preventing contact between the pair of sheets unless they are touched. The resistance of electrically conductive rows and columns on the pair of sheets is used to determine where the touch screen is touched. An analog measurement system in the touch screen controller determines the location of a touch with a very high resolution. The touch sensitive systems disclosed herein can be used to detect and determine the location of multiple simultaneous touches, with one simultaneous touch being identifiable in each cubic, or overlapping region of a row and a column. The width of the rows and columns and the resulting size of the cubics in the touch screen determines how close together two simultaneous touches can be while remaining independently detectable. A single touch screen controller can be used with groups of touch sensitive panels.

Before continuing to describe the simultaneous multiple location touch sensitive systems in more detail, a number of terms will be defined. The term "simultaneous" is used herein to refer to events that are overlapping in time, with the events not necessarily starting and ending at the same time. Various embodiments of the touch sensitive systems provide an apparatus for detecting a touch. The term "touch" is used herein to refer to any contact against a touch screen, by any implement such as a finger or stylus, etc. The phrase "a touch" may refer in some instances in the claims to a single point of contact or to multiple points of contact. The apparatus includes a touch screen and a controller. Some embodiments of the touch screen include multiple sheets that are substantially parallel. The phrase "substantially parallel" is used herein to refer to sheets that do not intersect or touch in their normal resting configuration. For example, a pair of sheets in a touch screen may be stacked and separated by spacers so that they only make contact when pressure against them pushes them into contact. The spacers may or may not be of the same size, so the gap between the two sheets is not necessarily the same at all points. The phrase "substantially parallel" encompasses these types of variations.

The touch screen includes a number of electrically conductive columns and rows. The phrase "electrically conductive columns and rows" refer to strips of electrically conductive material, of any shape and size. The terms "column" and "row" are used herein to refer to non-parallel strips that overlap at least to some degree. No inherent orientation is implied, and the terms "column" and "row" are interchangeable. Note also that the ends of each column or row are interchangeable. In one particular embodiment, columns and rows are oriented substantially perpendicularly to each other. The controller also includes an analog to digital (A/D) converter switchably and sequentially connected to each of the columns and rows. The A/D converter converts an analog value to a digital value. In one particular embodiment, the analog level of a voltage is read at an input and a digital number representing the voltage level is provided at an output of the A/D converter. The A/D converter may be a single integral device or may comprise multiple devices working together. For example, the A/D converter may comprise multiple A/D converters if the bandwidth of a single A/D converter cannot meet the performance requirements of the system. If multiple A/D converters are used, they are referred to elsewhere in this document collectively as a single A/D converter. The A/D converter and other elements of the controller may be embodied in hardware, firmware, software, etc., or any combination thereof. The term "switchably" is used herein to indicate that a connection may be made and unmade, or turned on and off. The term "sequentially" is used herein to mean one at a time, and does not imply any particular order or timing. Thus, an A/D converter that is switchably and sequentially connected to each of the columns and rows in a touch screen may be connected to one column or one row at a time. Overlapping of sequential connections falls within this definition so long as the A/D converter is able to read an independent value from each column or row to which it is connected. The controller also includes a voltage source switchably and sequentially connected to each of the columns and rows. The voltage source need not be entirely contained within the controller. For example, the voltage source may be an input to the controller that is connected externally to any supply of a voltage, such as a voltage regulated power supply.

Turning now to FIG. 1, an example of a resistive touch screen 10 with multiple columns 12 and rows 14 will be described. The columns 12 and rows 14 are electrically conductive strips with a given resistance, so that if one end 16 of a row 20 or a column were connected to a voltage and the other end 22 were connected to a ground or a different voltage, the voltage along the row 20 would change between the voltage level at the first end 16 and the second end 22. The resistance of the columns 12 and rows 14 have any value desired and may be constant at all points of each column or row or may vary in any fashion desired. In one particular embodiment, the resistance across a column or row (e.g., 20) is constant so that the voltage drop across the row 20 varies linearly as a function of distance. A resistive grid 24 is displayed in the bottom row 20 to illustrate how the columns 12 and rows 14 each form a resistive layer.

The touch screen 10 is an matrix of analog cubics. The touch screen 10 can have a much higher resolution than the number of columns 12 and rows 14, because each cubic formed by an overlapping column and row is sampled in an analog fashion so that the location of a touch can be identified within the cubic.

In one particular embodiment, the columns 12 and rows 14 (which can be formed of strips of resistive material or resistive strips that, as shown, are generally perpendicular to one another) are printed or otherwise deposited or formed on substantially transparent sheets made of any suitable material such as polyester, plastic or glass, etc. For example, the columns 12 are printed on one sheet and the rows 14 are printed on another sheet, and the two sheets are placed against each other in a layer with the columns 12 and rows 14 on the inside facing each other. Spacer dots of a transparent material are placed between the two sheets to keep them from touching each other unless the sheets are pressed by a finger or stylus or other implement. The size, distribution and composition of spacer dots that may be used in touch screens is known and will not be described in more detail herein. The columns 12 and rows 14 are oriented so that they overlap to form cubics 26. A cubic 26 is an overlapping region between a column and a row, in which the location of a single touch may be determined in the simultaneous multiple location touch system. The width of the columns 12 and rows 14 establish the size of the cubics (e.g., 26) and may be based on the width of the implement that will be used to touch the touch screen 10. For example, if the touch screen 10 will be manipulated by a finger, such as in a medical monitoring system in a hospital, the columns 12 and rows 14 may be about the width of a finger or a bit smaller to ensure that two simultaneous touches that are side by side can be detected. If the system does not need detection of side by side touches, the columns 12 and rows 14 may be wider than the touching implement.

The columns 12 and rows 14 may be formed of any suitable material, such as Indium Tin Oxide (ITO), etc., and may be deposited on the sheets in any suitable manner. Gaps (e.g., 30) are formed between each column (e.g., 32 and 34) and between each row (e.g., 36 and 40) to prevent neighboring columns 32 and 34 or neighboring rows 36 and 40 from shorting together. These gaps (e.g., 30) may have any suitable width and composition. For example, the gaps (e.g., 30) may be empty spaces between ITO strips, or may have a substantially transparent insulating material between. The gaps (e.g., 30) illustrated in FIG. 1 are exaggerated for clarity and may be much narrower if desired to avoid dead regions in which a touch cannot be detected.

The number of columns 12 and rows 14 included in the touch screen 10 may also be adjusted as desired. In the example of FIG. 1, the touch screen 10 includes twelve columns 12 and eight rows 14. Other examples herein include five columns and four rows. The number of columns 12 and rows 14 may be determined based on factors such as the size of a display over which the touch screen 10 is placed, the size of the cubics (e.g., 26), the number of simultaneous touches to be detectable, etc.

Electrical contacts 42 and 44 are formed at the ends (e.g., 16 and 22) of each column and row (e.g., 20) so that a wire or other electrical connector may be attached. In one embodiment, the electrical contacts 42 and 44 comprise bars of silver ink printed on the columns and rows (e.g., 20) in contact with the ITO or other resistive material forming the body 46 of the row or column (e.g., 20).

The transparency of the substantially transparent sheets and touch screen is not limited to any particular level. For example, a typical resistive touch screen may have a total transparency of about 81% with two ITO sheets each of 90% transparency, although this is merely an example and the term substantially transparent merely indicates that transparency is a desirable feature and that a material is selected that balances the desired transparency against other factors such as availability, cost, and suitability for use in a touch screen.

The naming convention of the columns 12 and rows 14 used herein is that rows 14 are on the X layer and columns 12 are on the Y layer. Columns 12 and rows 14 are lettered starting with A in the upper left corner 50 of the touch screen 10. Each column 12 is labeled with a "+" at a first end at the top of FIG. 1 and with a "−" at a second end at the bottom of FIG. 1, and each row 14 with a "+" at a first end at the left of FIG. 1 and with a "−" at a second end at the right of FIG. 1. As mentioned above, rows and columns are interchangeable, in other words, the columns 12 may be on the X layer and rows 14 may be on the Y layer. Furthermore, the first and second ends of the columns 12 and rows 14 are interchangeable.

Figure 2:
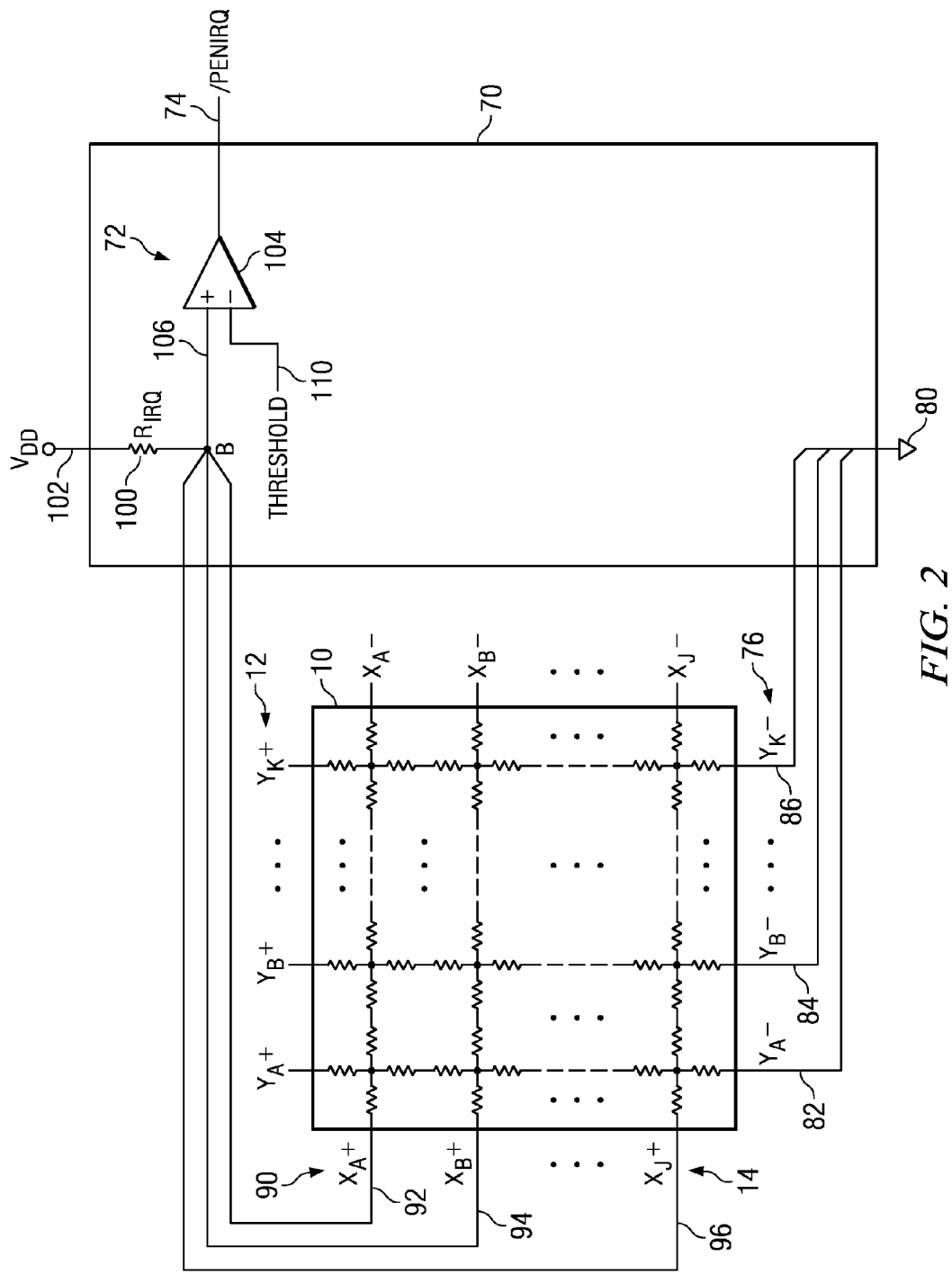
FIG. 2 depicts a touch screen and controller, with the controller configured to detect the presence of one or more touches anywhere on the touch screen.

Turning now to FIG. 2, various embodiments of the simultaneous multiple location touch system include a controller 70 connected to the touch screen 10, with a touch detector 72 in the controller 70 that senses when one or more locations on the touch screen 10 are touched. The touch detector 72 generates a signal /PENIRQ 74 that changes state when the touch screen 10 is touched. The controller 70 then begins to scan and measure the resistance of the columns and rows in the touch screen 10 to identify the one or more locations that were touched. The touch detector 72 enables the controller 70 to save power by only operating fully when the touch screen 10 has been touched. In one embodiment, the touch detector 72 includes a switchable connection between one end 76 of all the columns 12 to ground 80. In this case, the ground is connected to the bottom end 76 of the columns 12, or column ends $Y_A$− 82, $Y_B$− 84, up to $Y_K$− 86 (where there are K columns 12). The ends 76 of the columns 12 are switchably connected to ground 80 by the touch detector 72 so they can be disconnected from ground 80 during the scanning and measuring operation to be discussed below. The ends 90 of the rows 14, including row end $X_A$+ 92, $X_B$+ 94, up to $X_J$+ 96 (where there are J rows 14) are connected by a pullup resistor 100 to a voltage source 102. A comparator 104 has a first input 106 connected to the ends 90 of the rows 14 and a second input 110 connected to a threshold voltage source. The pullup resistor 100 is sized such that when one or more locations on the touch screen 10 are pressed anywhere on the touch screen 10, the first input 106 will be pulled down below the threshold voltage on the second input 110 and the output signal 74 from the comparator 104 will turn off. This signals that the touch screen 10 has been touched and the scanning and measuring operation should commence. The connection of the ends 90 of the rows 14 to the pullup resistor 100 and comparator 104 is made in switchable fashion so that the ends 90 of the rows 14 can be disconnected from the pullup resistor 100 and comparator 104 during the scanning and measuring operation. The connection of the ends 76 of the columns 12 to ground 80 and the ends 90 of the rows 14 can be made by a multiplexer or any other suitable means in the controller 70.

Figure 3:
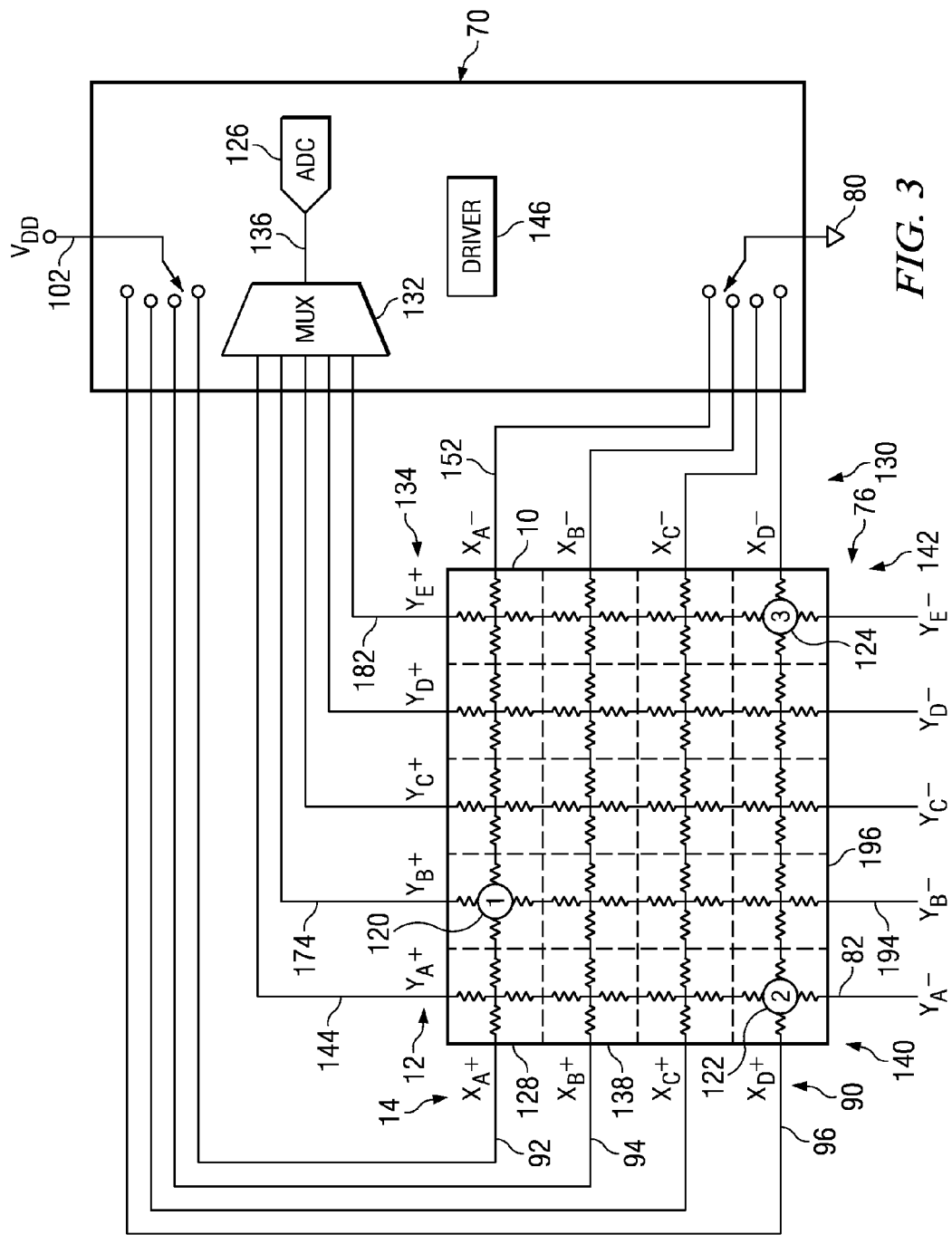
FIG. 3 depicts a touch screen and controller, with the controller configured to scan and measure multiple X coordinates of touches on the touch screen.

Turning now to FIG. 3, the scanning and measuring operation to measure X coordinates in the touch screen 10 will be described. In this example, the touch screen 10 includes five columns 12 and four rows 14. The detection and identification of three touched locations 120, 122 and 124 will be described. To detect and identify the position of the multiple touch locations 120, 122 and 124, the controller 70 excites the columns 12 and rows 14 with a voltage from a voltage source 102, samples the voltages within the touch screen 10 and converts the X and Y coordinates at all three locations 120, 122 and 124 with an A/D converter 126. The controller 70 generates the X coordinates by exciting the rows with a voltage and sampling the resulting voltages from the columns. The controller 70 generates the Y coordinates by exciting the columns with a voltage and sampling the resulting voltages from the rows. The controller 70 sequentially applies an excitation voltage from a voltage source 102 to one end 90 of each of the rows 14 of the touch screen 10 and a ground 80 to the other end 130 of the rows 14. While the excitation voltage and ground 80 is applied across a row (e.g., 128), that row 128 acts as a voltage divider with the voltage level gradually decreasing from the excitation voltage on the first end 90 to the ground voltage on the second end 130. While the excitation voltage and ground 80 is applied to each of the rows 14, the controller 70 sequentially reads the voltage of each of the columns 12. Thus, while the excitation voltage is applied to the first end $X_A+$ of the first row 128 and the ground 80 is applied to the second end $X_A-$ of the first row 92, the A/D converter 126 is connected by a multiplexer 132 in the controller 70 sequentially to the first end 134 of each of the columns 12, including $Y_A+$ 144, $Y_B+$ 174, all the way up to the last column $Y_E+$ 182. (Note that although FIG. 3 is simplified to show the sampling of X coordinates, the multiplexer 132 is also connected to the end 90 of the rows 14 to read voltages from the rows 14 during the sampling of Y coordinates. The multiplexer 132 or other switches may also be used to connect ground 80 and power 102 to the columns 12 during the sampling of Y coordinates and to the rows 14 during the sampling of X coordinates. Again, FIG. 3 is simplified to clarify the description of the X sampling process, but it will be understood that the multiplexer 132 and any other switches as desired may be connected in the controller 70 in any suitable way to perform the excitation and sampling of columns 12 and rows 14 as described herein.) The term "multiplexer" is used herein to refer to any hardware, firmware or software that can selectably establish connections between a number of inputs and outputs. As explained earlier, the order of excitation and sampling may be varied as desired. Once each end 134 of the columns 12 has been sampled by the A/D converter 126, the excitation voltage from the voltage source 102 and the ground 80 are disconnected from the first row 128 and are connected to the second row 138, and the A/D converter 126 is sequentially connected again to the first end 134 of each of the columns 12. This process continues until every cubic of the touch screen 10 has been sampled for X coordinates of touched locations. Note that the other end 76 of the columns 12 is left floating during the sampling process by the A/D converter 126. The columns 12 act as probes during the sampling process to measure the voltage at any touched location on the columns 12. Because the current flowing into the A/D converter 126 is very low, there is a negligible voltage drop along the columns 12 before reaching the A/D converter 126. Note that a buffer may be placed between the columns 12 and the A/D converter 126 if desired.

Again, note that the touch screen 10 forms an analog matrix, with each cubic forming an entry in the matrix. Each cubic is an analog region to be sampled by the A/D converter 126, returning a voltage within a range depending on the location of a touch within the cubic.

If the cubic being excited and scanned was not pressed, there is no electrical contact between the columns 12 and the rows 14 in that cubic and the resistance between the column and row of the excited and scanned cubic will be very high. This results in a very low voltage being received at the input 136 of the A/D converter 126, generating a very small digital number at the output of the A/D converter 126. The sampled voltage should fall within a voltage range based on the voltage dividing taking place in the touch screen 10 when a location is touched, or around the ground voltage (or below a small threshold value) if not touched. The controller 70 may compare the sampled voltage with a voltage range to determine whether the excited and scanned cubic was touched. An X coordinate will only be generated by the controller 70 from the output of the A/D converter 126 if the sampled voltage is within the voltage range. The voltage range or small threshold value may be set at any desired level to filter out and ignore noise. The comparison with the range may be performed at the analog side on the input 136 of the A/D converter 126 or on the digital side with the output of the A/D converter 126 as desired.

The resistance of the columns 12 and rows 14 and the contacts between them, and the excitation voltage from the voltage source 102 and the voltage level of the ground 80 may be adjusted and scaled as desired to fit within and use as much as possible of the input voltage range of the A/D converter 126. A touch at the left edge 140 of the touch screen 10 would result in a sampled voltage of about the excitation voltage from the voltage source 102, which in one embodiment provides about the maximum possible number from the A/D converter 126. For example, with a twelve bit A/D converter 126, this would produce a number of about 4095. A touch at the right edge 142 of the touch screen 10 would result in a sampled voltage just above the voltage level of the ground 80, which should produce a low number from the A/D converter 126 just above the number corresponding to the threshold voltage level for a touch. Note that a touch at the right edge 142 should result in a higher sampled voltage than no touch so that the controller 70 can identify a touch at the right edge 142 of the touch screen 10. A resistor may be added between the touch screen 10 and ground 80 if needed to establish this non-zero sampled voltage from a touch at the right edge 142 of the touch screen 10, although in one embodiment resistance in the lower end 130 of the rows 14 is sufficient to establish this non-zero sampled voltage from a touch at the right edge 142 of the touch screen 10.

Once the X scanning operation has been completed, a Y scanning operation is performed. The Y scanning operation is identical to the X scanning operation, except that the excitation voltage is applied to the first end 134 of the columns 12 and the ground 80 is applied to the second end 76 of the columns 12, while an end 90 of each of the rows 14 is sampled by the A/D converter 126. For example, the excitation voltage from the voltage source 102 is applied to the first end $Y_A+$ 144 of the first column and ground 80 is applied to the second end 82. During this excitation of the first column, one end 90 of each of the rows 14 is sequentially connected to the A/D converter 126. For cubics containing a touched location 120, 122 and 124, the sampled voltage and resulting value from the A/D converter 126 will exceed the threshold voltage, indicating that the cubic was touched, and the number from the A/D converter 126 for each touched cubic generated during the X scanning process and the Y scanning process are used as the X and Y coordinates, respectively, of the location (e.g., 120) that was touched on the touch screen 10.

The excitation and scanning of the X and Y planes may be repeated if desired any number of times, with the results averaged, to improve the stability of the results. This averaging is limited by the speed of the sequential excitation and sampling process, which is in turn limited by the speed of the A/D converter 126. For example, the process may run at 20 kHz, 200 kHz, or any other speed desired, as long as it is fast enough to keep up with the most rapid of touches to the touch screen 10.

The driving of the excitation, scanning and sampling processes in the controller 70, the threshold voltage comparisons, and the correlation and generation of X and Y coordinates from touched cubics may be performed by a driver 146 comprising any hardware, firmware, software or desired combination thereof in the controller 70.

Figure 4A:
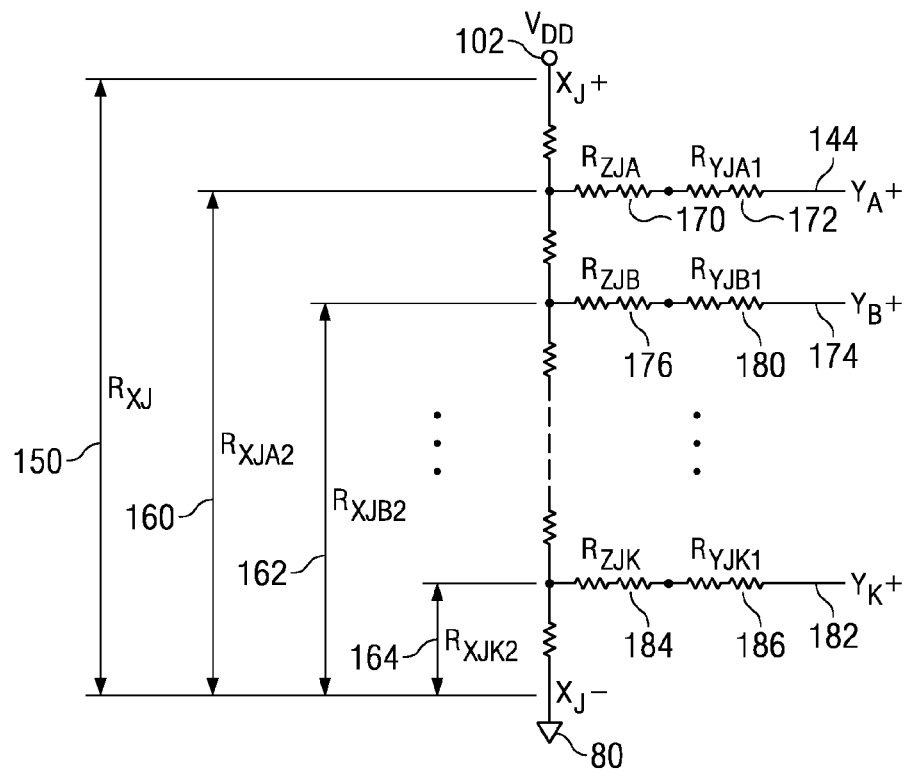
FIGS. 4A and 4B depict equivalent circuits for the measurement of X coordinates of FIG. 3.
Figure 4B:
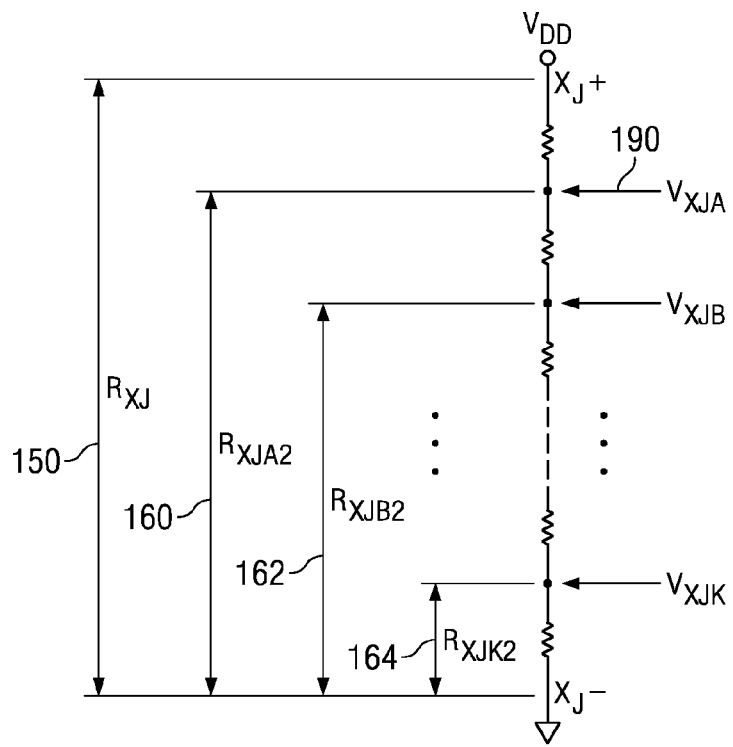

Turning now to FIGS. 4A and 4B, the equivalent circuitry of the touch screen 10 during X coordinate scanning and sampling will be described. The resistance along an entire row (e.g., 128) is denoted $R_{XJ}$ 150, where J is the row identifier. For example, for the first row $X_A$ 92, the resistance along the entire row is $R_{XA}$. The resistance along a row (e.g., $X_A$ 128) from a given cubic or column to the lower end $X_A$– 152 is denoted $R_{XJK2}$, where X indicates that the resistance is for a row, J is replaced with the letter identifying the row, K is replaced with the letter identifying the starting column, and the numeral 2 indicates that the resistance measurement extends to the lower end (e.g., $X_A$– 152) of the row (e.g., 128). For example, the resistance of location 1 120 of the lower end $X_A$– 152 is denoted $R_{XAB2}$, indicating that it is the resistance of row A from column B to the lower end $X_A$– 152. Similarly, the resistance of a column is denoted $R_{YJK\#}$, where J is the row letter, K is the column letter, and the # is 1 if the indicated resistance extends to the first or upper end 134 of the columns 12 and 2 if it extends to the second or lower end 76. The resistance at a touch location between a row and column is denoted $R_{ZJK}$, where Z indicates that it is the resistance between a row and column, J identifies the touched row and K identifies the touched column. Note that the resistance between a touched column and row is dependent on the pressure of the contact. The resistance of a touched location within each cubic falls within a range. For example, if each of the columns 12 has a total resistance of 400Ω, with each column being divided across four rows, the resistance measured within a particular row of a column would fall within a range of 100Ω.

Turning to FIG. 4A, the resistance at each cubic of a row J is $R_{XJ}$ 150 for the entire row, $R_{XJA2}$ 160 for the resistance along the J'th row from column A to the lower end 130 of the row, $R_{XJB2}$ 162 for the resistance along the J'th row from column B to the lower end 130 of the row, continuing to $R_{XJK2}$ 164 for the resistance along the J'th row from column K to the lower end 130 of the row. The resistance from the row side of the JA cubic (row J, column A) to the $Y_A$+ end 144 of column A is $R_{ZJA}$ 170, the resistance from the row to the column in cubic JA, plus $R_{YJA1}$ 172, the resistance of column A from row J to the upper end 134 of the column. The resistance from the row side of the JB cubic (row J, column B) to the $Y_B$+ end 174 of column B is $R_{ZJB}$ 176, the resistance from the row to the column in cubic JB, plus $R_{YJB1}$ 180, the resistance of column B from row J to the upper end 174 of the column. The resistance from the row side of the JK cubic to the $Y_K$+ end 182 of column K is $R_{ZJK}$ 184 plus $R_{YJK1}$ 186.

As discussed above, the current along the column or row being sampled and measured is very small, so in the equivalent circuit of FIG. 4A, the $R_Z$ (e.g., 170) and $R_Y$ (e.g., 172) resistances have a negligible effect on the sampled voltage. Thus, as seen in FIG. 4B, the voltage $V_{XJA}$ 190 can be expressed as $V_{DD} \times (R_{XJA2}/R_{XJ})$, voltage $V_{XJB}$ can be expressed as $V_{DD} \times (R_{XJB2}/R_{XJ})$, and so on.

Turning back to FIG. 3, the coordinates for the touch at location 1 120 may be determined as follows. The voltage read from the X scanning operation for the touch location 1 120 at a center spot is expressed by $V_{1X}=V_{DD} \times (R_{XAB2}/R_{XA})=V_{DD} \times (350/500)$ or about $0.7 V_{DD}$, where the resistance from location 1 120 to the lower end $X_A$– 152 of row A is about 350Ω (three cubics at 100Ω each plus ½ of cubic AB containing location 1 120), and wherein the total resistance of the row A 128 is 500Ω. For a twelve bit A/D converter 126, this would result in a digital result of about 4095×(350/500) or about 2867. The voltage read from the Y scanning operation for the same cubic AB is expressed as $V_{1Y}=V_{DD} \times (R_{YAB2}/R_{YA})=V_{DD} \times (350/400)$ or about $0.9 V_{DD}$, where the resistance from location 1 120 to the lower end $Y_B$– 194 of column B is about 350Ω (three cubics at 100Ω each plus ½ of cubic AB containing location 1 120), and wherein the total resistance of the column B 196 is 400Ω. For a twelve bit A/D converter 126, this would result in a digital result of about 4095×(350/400) or about 3583. The resulting X,Y coordinate for location 1 120 would be 2867,3583. Note that this example assumes that location 1 120 is in the center of cubic AB, and does not take into account any scaling that may be done on the sampled voltages before being converted in the A/D converter 126.

Again, it is important to note that the voltage read from a cubic will fall within a range, because the touch screen 10 forms an analog matrix, or a matrix of analog cubics each having a range of possible output voltages.

Note that the excitation voltage applied to rows and columns does not necessarily have a constant voltage level, and could be at different voltage levels for rows versus columns or other varying schemes as desired. In one particular embodiment, however, the excitation voltage is constant.

Turning now to FIGS. 5A, 5B and 5C, touch screens with various combinations of single location touch panels and multiple location touch panels will be described. This may be used, for example, when two or more touch panels reside at different locations but need to be operated in a coordinated and simultaneous fashion. A single controller 70 of the simultaneous multiple location touch system may be used to detect and determine the location of touches in the multiple touch panels in a number of various configurations. As illustrated in FIG. 5A, a touch screen operated by a single controller 70 may include a pair of single location touch panels 200 and 202, with the touch panels 200 and 202 connected as a row of two columns. Each single location touch panel 200 and 202 may only be touched simultaneously in a single location, but the controller 70 can detect a single touch on each of the two panels 200 and 202 simultaneously. The X resolution of the A/D converter 126 in the controller 70 is divided across the two panels 200 and 202. As illustrated in FIG. 5B, three multiple location touch panels may be connected together to form a column of three rows of multiple location touch panels 204, 206 and 210. If each panel 204, 206 and 210 includes four columns and two rows, the overall touch screen seen by the controller 70 has four columns and six rows to be divided across the resolution of the A/D converter 126. It will be seen that the combination of multiple panels in a touch screen 10 is limited mainly by the resolution of the A/D converter 126, although other factors such as A/D conversion time and sampling rate may also be limiting. Panels may be combined in any number of ways, such as in FIG. 5C in which a four column two row multiple location touch panel 212 forms the first row and a pair of four row two column multiple location touch panels 214 and 216 form a second row. The resulting overall touch screen 10 has four columns and six rows.

Figure 6:
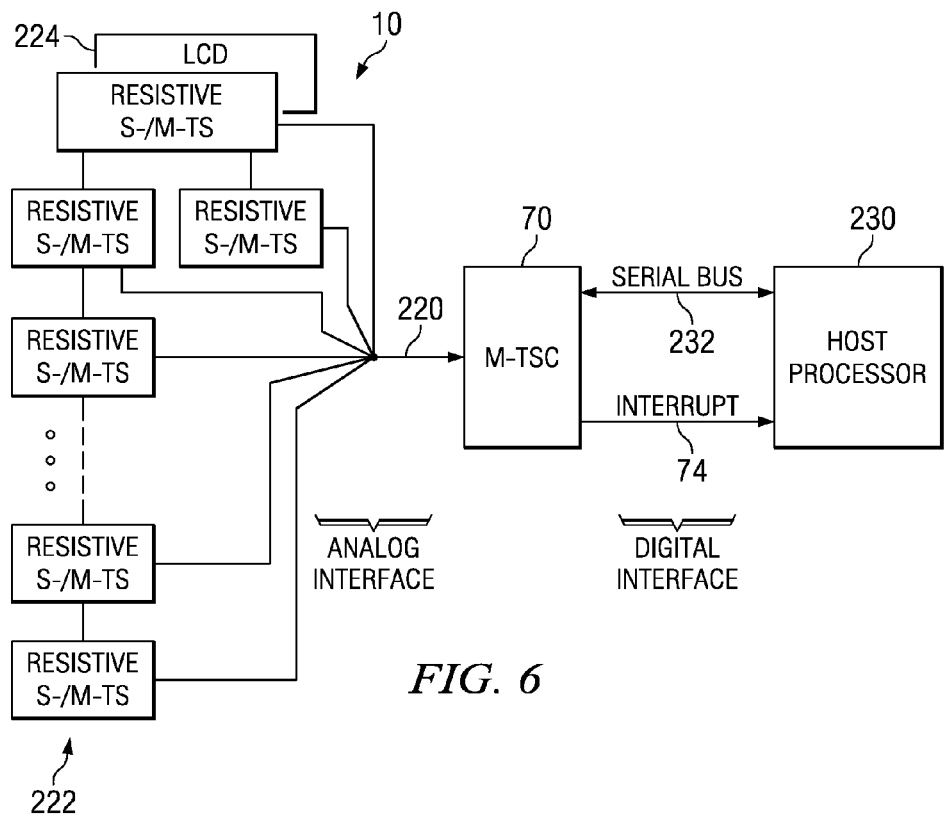
FIG. 6 depicts a block diagram of a host processor and controller used with multiple touch sensitive panels connected in various example configurations.

Turning now to FIG. 6, the overall architecture of a simultaneous multiple location touch system will be described. A multiple location touch screen controller 70 (M-TSC) is connected by an analog interface 220 to one or more panels 222 in a touch screen 10. The panels 222 may include one or more multiple location touch screen (M-TS), one or more single location touch screens (S-TS), or any combination thereof desired. An LCD panel 224 or other display may be placed behind each panel or combination of panels as desired in the touch screen 10. A host processor 230 is connected to the controller 70 by a digital interface, for example including a serial bus 232 for transferring X,Y coordinates from the controller 70 to the host processor 230 and an interrupt signal 74 to alert the host processor 230 when the touch screen 10 has been touched.

Figure 7:
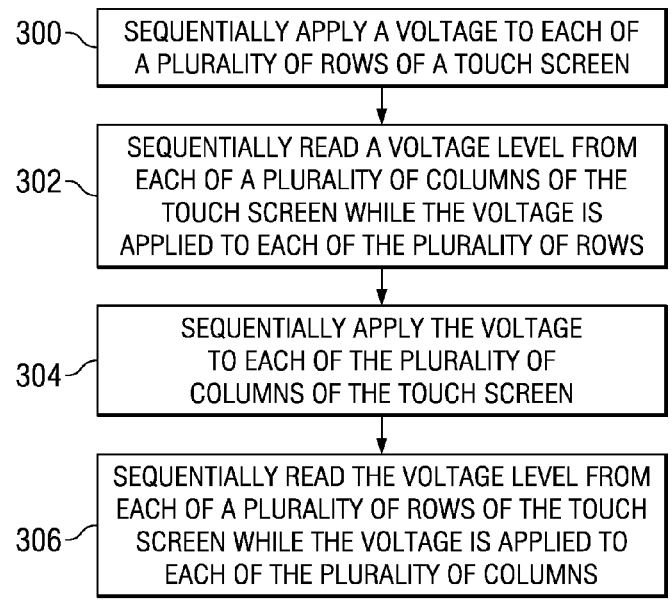
FIG. 7 depicts a method of detecting multiple simultaneous touches on a touch screen.

A method of detecting multiple simultaneous touches on a touch screen is illustrated in the flow chart of FIG. 7. The method includes sequentially applying a voltage to each of a plurality of rows of the touch screen (block 300) and sequentially reading a voltage level from each of a plurality of columns of the touch screen while the voltage is applied to each of the plurality of rows (block 302). In other words, while the voltage is applied to one row, the voltage level is sampled and read from each column. The voltage is then applied to another row, and the voltage level is again sampled and read from each column. This is performed repeatedly until each row in a touch screen has been excited and sampled to obtain X coordinates for all touched locations. The method also includes sequentially applying the voltage to each of the plurality of columns of the touch screen (block 304) and sequentially reading the voltage level from each of a plurality of rows of the touch screen while the voltage is applied to each of the plurality of columns. (Block 306) In other words, while the voltage is applied to one column, the voltage level is sampled and read from each row. The voltage is then applied to another column, and the voltage level is again sampled and read from each row. This is performed repeatedly until each column in a touch screen has been excited and sampled to obtain Y coordinates for all touched locations. In some embodiments, the method also includes comparing each sampled voltage level with a threshold voltage level to determine whether a touch occurred. The method may also include generating X coordinates from sampled voltage levels obtained during an X scanning process for each sampled voltage level that exceeds the threshold voltage level, and generating a Y coordinate from sampled voltage levels obtained during a Y scanning process for each sampled voltage level that exceeds the threshold voltage level. In some embodiments, the method may also include determining that the touch screen has been touched before the X and Y scanning procedures are started. The determining may include pulling up a voltage level on the plurality of rows through a resistor and applying a ground to the plurality of columns and monitoring the voltage level on the plurality of rows, and indicating that the touch screen has been touched when the voltage level on the plurality of rows falls below a threshold voltage level.

The simultaneous multiple location touch system disclosed herein provides a simple and reliable way to detect simultaneous touches on a resistive touch screen. It provides a resistive touch screen that is subdivided into an analog matrix from which multiple simultaneous touches can be detected and located, while providing a much higher resolution than the number of rows and columns. While illustrative embodiments have been described in detail herein, it is to be understood that the concepts disclosed herein may be otherwise variously embodied and employed, and that the appended claims are intended to be construed to include such variations, except as limited by the prior art.

What is claimed is:

1. An apparatus for detecting a touch, the apparatus comprising:
    a touch screen having:
        a first sheet having a first set of set of resistive strips, wherein each resistive strip from the first set forms a column; and
        a second sheet having a second set of resistive strips, wherein each resistive strip from the second set forms a row, wherein the first and second sheet are substantially parallel to one another separated from each other by a plurality of spacers, wherein the first and second sets of substantially perpendicular to one another; and
    a controller having:
        an analog-to-digital converter (ADC) that is configured to switchably and sequentially coupled to each of the plurality of columns and to each of the plurality of rows; and
        a voltage source that is configured to be switchably and sequentially coupled to each of the plurality of columns and the plurality of rows, wherein the controller is adapted to couple the voltage source to one of the plurality of rows when the ADC is sequentially coupled to each of the plurality of columns and to couple the voltage source to one of the plurality of columns when the analog to digital converter is sequentially coupled to each of the plurality of rows, and wherein the first and second sets of resistive strips form an analog matrix having a resolution that is greater than the number of resistive strips in the first set multiplied by the number of resistive strips in the second set.

2. The apparatus of claim 1, wherein the controller further comprises a multiplexer that is coupled to the ADC and each of the resistive strips from the first and second sets of resistive strips.

3. The apparatus of claim 2, wherein each resistive strip from the first set of resistive switches is switchably coupled to ground, and wherein the controller further comprises a touch detector having:
    a pullup resistor that is coupled between each resistive strip from the second set and a voltage source;
    a comparator that is coupled to the pullup resistor and a threshold voltage source, wherein the output changes state when the touch screen is touched.

4. The apparatus of claim 2, the controller further comprising a driver that is coupled to the multiplexer, wherein the driver is configured to sequentially couple the voltage source and ground to at least one resistive strip from the second set, while coupling the ADC to each resistive strip from the first set.

5. The apparatus of claim 4, wherein the driver is configured to sequentially couple the voltage source and ground to at least one resistive strip from the first set, while coupling the ADC to each resistive strip from the first set.

6. The apparatus of claim 5, wherein the controller is adapted to determine when an overlapping region of one of the resistive strips from the second set and one of the resistive strips from the first set has been pressed by comparing a value from the ADC with a range.

7. The apparatus of claim 6, wherein the controller is adapted to generate an X coordinate from a first value from the ADC, wherein the first value was read from one of the resistive strips from the first set while the voltage source was connected to one of the resistive strips from the second set, and to generate a Y coordinate from a second value from the ADC, wherein the second value was read from one of the resistive strips from the second set while the voltage source was connected to one of the resistive strips from the first set.

8. The apparatus of claim 7, wherein the X and Y coordinates designate a location of a first touch on the touch screen, wherein the controller is adapted to generate a second X coordinate and a second Y coordinate designating a location of a simultaneous second touch on the touch screen.

* * * * *